US006968737B2

(12) United States Patent
Chen et al.

(10) Patent No.: US 6,968,737 B2
(45) Date of Patent: Nov. 29, 2005

(54) POSITION DETERMINING SYSTEM USING TRANSMITTED POSITION INFORMATION

(75) Inventors: Kuo-Wei Herman Chen, Scotch Plains, NJ (US); Peter Frank Driessen, Aberdeen, NJ (US); Richard Dennis Gitlin, Little Silver, NJ (US); Krishan Kumar Sabnani, Westfield, NJ (US); Theodore Sizer, II, Little Silver, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/778,124

(22) Filed: Jan. 2, 1997

(65) Prior Publication Data

US 2003/0066345 A1    Apr. 10, 2003

(51) Int. Cl.$^7$ ............................................. G01C 21/00
(52) U.S. Cl. ................................................. 73/178 R
(58) Field of Search ............................. 342/357, 457, 342/463, 418, 417, 352; 364/449; 73/178 R; 379/58–60; 455/33.4, 33.1, 56.1, 73, 12.1, 13.1, 13.2, 455/13.4, 341, 541, 63, 316, 456; 340/539, 340/988, 991, 993

(56) References Cited

U.S. PATENT DOCUMENTS

| | | | | |
|---|---|---|---|---|
| 3,573,819 A | * | 4/1971 | Mason ........................ 343/6.5 |
| 3,613,095 A | * | 10/1971 | Elwood .................. 343/112 D |
| 3,623,002 A | * | 11/1971 | Mayne et al. ............ 340/172.5 |
| 3,680,121 A | | 7/1972 | Anderson et al. |
| 3,689,926 A | | 9/1972 | Honore et al. |
| 3,696,427 A | * | 10/1972 | Nard ........................ 343/112 D |
| 3,714,650 A | * | 1/1973 | Fuller et al. ........... 343/6.5 LC |
| 3,715,758 A | | 2/1973 | Sender |
| 3,750,178 A | | 7/1973 | Hulst |
| 3,916,410 A | * | 10/1975 | Elwood ................... 343/112 D |
| 3,988,734 A | * | 10/1976 | Elwood ................... 343/112 R |
| 4,083,047 A | * | 4/1978 | Schalow .................. 343/7 VM |
| 4,106,022 A | * | 8/1978 | Last ........................ 343/105 R |
| 4,203,115 A | * | 5/1980 | Hannigan ................ 343/112 R |
| 4,457,006 A | * | 6/1984 | Maine ......................... 455/316 |
| 4,651,156 A | | 3/1987 | Martinez |
| 4,799,062 A | | 1/1989 | Sanderford, Jr. et al. |
| 4,965,586 A | * | 10/1990 | O'Neill et al. .............. 342/357 |
| 5,032,845 A | | 7/1991 | Velasco |
| 5,045,861 A | | 9/1991 | Duffett-Smith |
| 5,095,500 A | * | 3/1992 | Tayloe et al. ............ 379/32.01 |
| 5,150,310 A | | 9/1992 | Greenspun et al. |
| 5,379,047 A | * | 1/1995 | Yokev et al. ................ 342/457 |
| 5,422,813 A | | 6/1995 | Schuchman et al. |
| 5,499,032 A | | 3/1996 | Kelley et al. |
| 5,508,707 A | | 4/1996 | LeBlanc et al. |
| 5,515,062 A | | 5/1996 | Maine et al. |
| 5,602,903 A | * | 2/1997 | LeBlanc et al. .............. 379/60 |
| 5,666,647 A | * | 9/1997 | Maine ........................ 455/12.1 |
| 5,774,829 A | * | 6/1998 | Cisneros et al. ............ 342/457 |

(Continued)

Primary Examiner—William Oen (57) ABSTRACT

The present invention is a system and method for automated position location using RF signposting. The present invention comprises a plurality of transmitting units placed throughout a service area. Each transmitting unit repeatedly transmits a signal including position information related to a position associated with the transmitting unit. The position information may be an absolute position or an encoded position based on the structure of a building in which the transmitting unit is located. A receiving unit receives the signal transmitted from a transmitting unit and determines the position of the receiving unit, based on the received indication. The transmitting units are placed to provide uniform coverage of the service area, thus providing position location indoors and in urban areas where GPS does not function properly.

38 Claims, 6 Drawing Sheets

U.S. PATENT DOCUMENTS

| | | | |
|---|---|---|---|
| 5,898,680 A | * | 4/1999 | Johnstone et al. .......... 701/213 |
| 5,912,644 A | * | 6/1999 | Wang ......................... 342/457 |
| 5,957,995 A | * | 9/1999 | Beckmann et al. ......... 701/213 |
| 6,029,106 A | * | 2/2000 | Hale et al. .................... 701/50 |
| 6,104,815 A | * | 8/2000 | Alcorn et al. ................ 380/251 |
| 6,140,958 A | * | 10/2000 | Johnson et al. ........ 342/357.09 |
| 6,181,911 B1 | * | 1/2001 | Sih et al. ................... 455/12.1 |
| 6,317,058 B1 | * | 11/2001 | Lemelson et al. .......... 340/910 |

\* cited by examiner

POSITION DETERMINING SYSTEM USING TRANSMITTED POSITION INFORMATION

FIELD OF THE INVENTION

The present invention relates to a system and a method for determining position using terrestrial transmitters and mobile receivers.

BACKGROUND OF THE INVENTION

Automated position locating systems have become important components of many military and civilian systems and operations. The Global Positioning System (GPS) provides position location using satellites. However, a typical GPS receiver requires signals from four or more GPS satellites in order to function properly. A problem arises with GPS indoors or in urban areas where the signals from satellites are often blocked by buildings. A need arises for a system which provides automated position location indoors or in urban areas where GPS does not function properly.

SUMMARY OF THE INVENTION

The present invention provides a system and a method for automated position location using RF signposting. In that regard, the present invention provides accurate and available position location indoors and in urban areas where GPS does not function properly.

The present invention includes a plurality of transmitting units placed throughout a service area. Each transmitting unit repeatedly transmits a signal including position information related to a position associated with the transmitting unit. The position information may be an absolute position or an encoded position based on the structure of a building in which the transmitting unit is located. A receiving unit receives the signal transmitted from a transmitting unit and determines the position of the receiving unit, based on the received indication. The transmitting units are placed to provide uniform coverage of the service area, thus providing position location indoors and in urban areas where GPS does not function properly.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
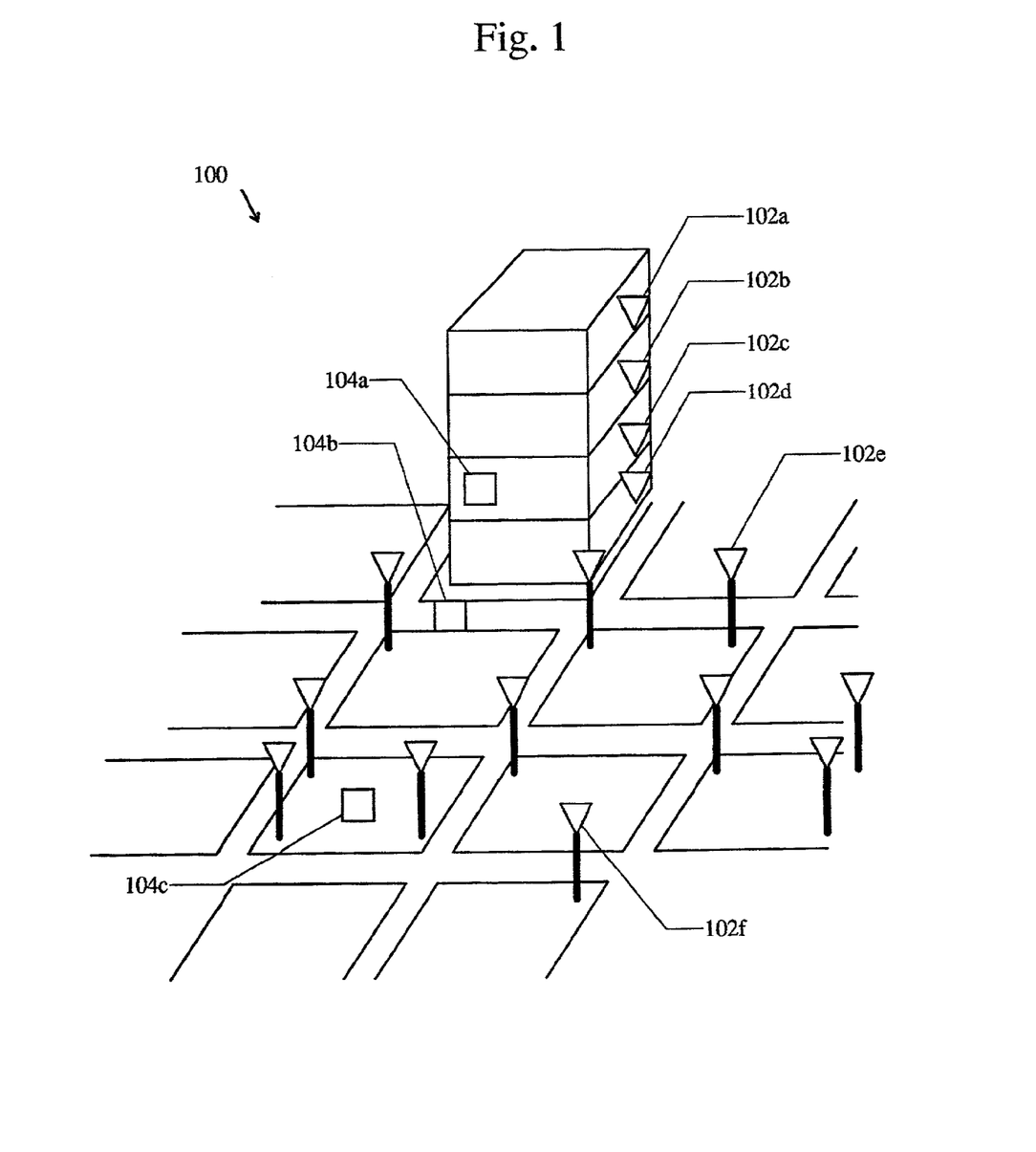
FIG. 1 is an exemplary block diagram of a radio frequency (RF) signposting system according to the present invention.

FIG. 1 is an exemplary block diagram of a radio frequency (RF) signposting system 100 installed in an urban area, such as, for example, New York City. A plurality of transmitting units 102a–f are deployed at various locations in the city. For example, transmitting units 102e–f are deployed on lampposts at selected street corners. Transmitting units 102a–d are deployed on different floors of a particular building. Transmitting units 102 may also be deployed at other locations, such as, for example, on traffic signals, utility poles, tops of buildings, etc. The locations are selected for ensuring complete coverage of the service area and for providing the desired position resolution. Each transmitting unit periodically transmits a radio frequency signal that includes information. All transmitting units transmit on a common frequency or RF channel. The repeat time of each transmitting unit is different so that packet collisions on the common RF channel are reduced.

Mobile receiving units 104a–c may be located anywhere within the service area. Each receiving unit 104 receives a signal transmitted from each transmitting unit which is within range and extracts the position information from each received signal. The position of the receiving unit is then determined from the respectively received position information.

Figure 2:
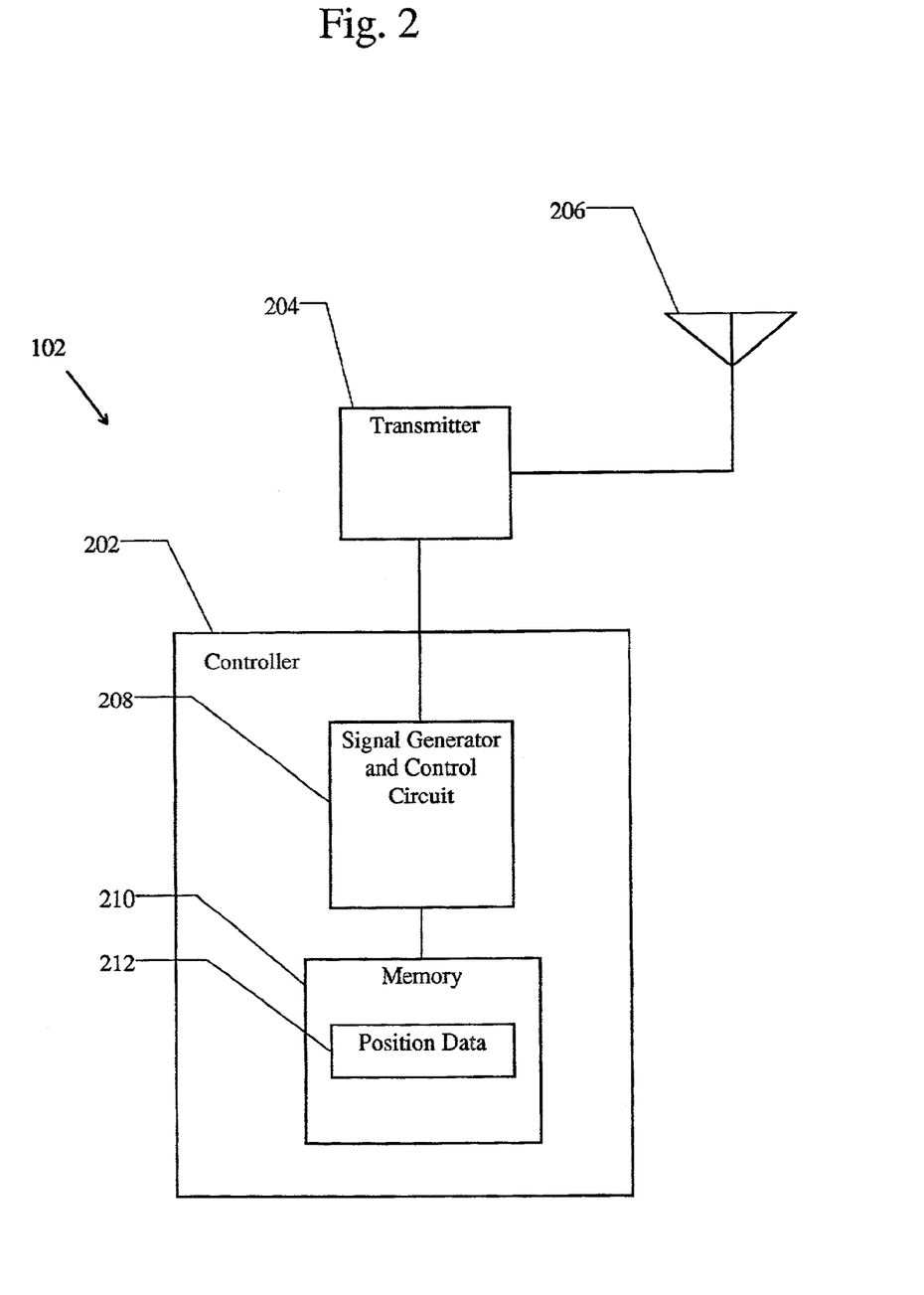
FIG. 2 is a block diagram of a transmitting unit according to the present invention.

FIG. 2 is a block diagram of a transmitting unit 102, as shown in FIG. 1. Controller 202 generates a position information signal that is applied to radio frequency transmitter 204, which modulates, in a well known manner, a radio frequency carrier in accordance with the input position information signal. Transmitter 204 outputs a radio frequency signal to antenna 206, which broadcasts the signal.

Controller 202 includes a memory 210 which contains position data 212. Position data 212 indicates the position of the transmitting unit within the service area. Signal generator and control circuit 208 accesses memory 210, obtains position data 212 and generates the position information signal which is output from controller 202. Circuit 208 also controls the timing of periodic or intermittent transmissions. Circuit 208 may be a microcontroller, a microprocessor, a programmed logic device, a custom integrated circuit, or other logic device.

Preferably, the transmitting unit used is a commonly available radio packet transmitter using a frequency of approximately 2.45 GHz. An antenna 206, which matches the output impedance of the transmitter, is also commonly available.

Figure 3:
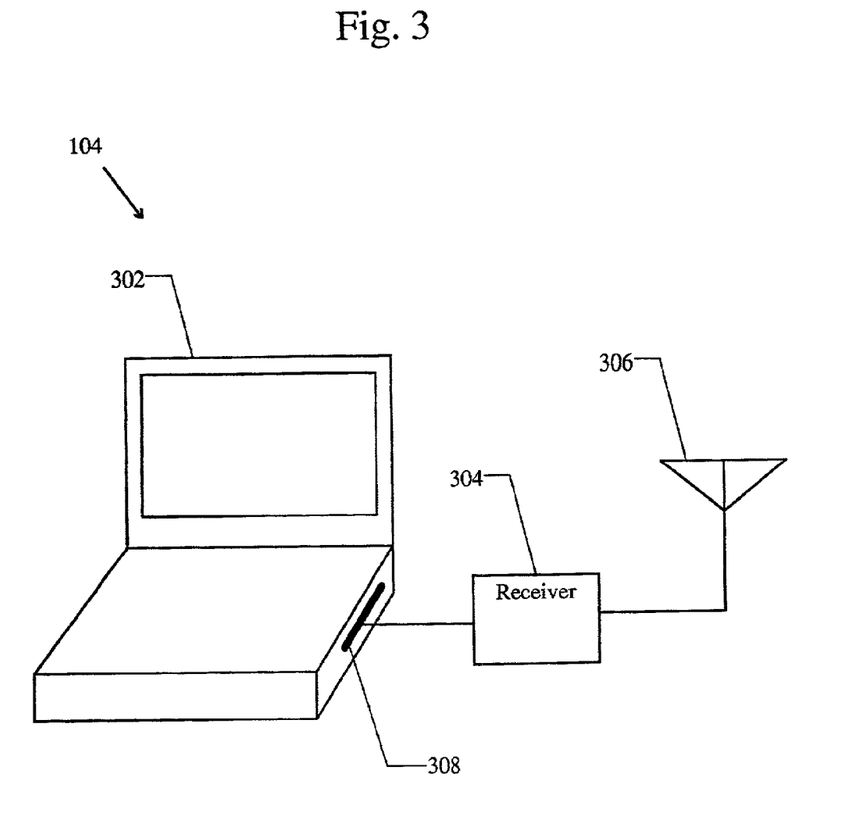
FIG. 3 is a block diagram of a mobile receiving unit according to the present invention.

FIG. 3 is a block diagram of a mobile receiving unit 104, shown in FIG. 1. RF signals broadcast by transmitting units are received by antenna 306. The signals are input to receiver 304, which detects, amplifies and demodulates, in a well known manner, the signal and extracts the position information from the signal. Receiver 304 outputs a serial digital signal which is input through serial port 308 to computer system 302.

Figure 4:
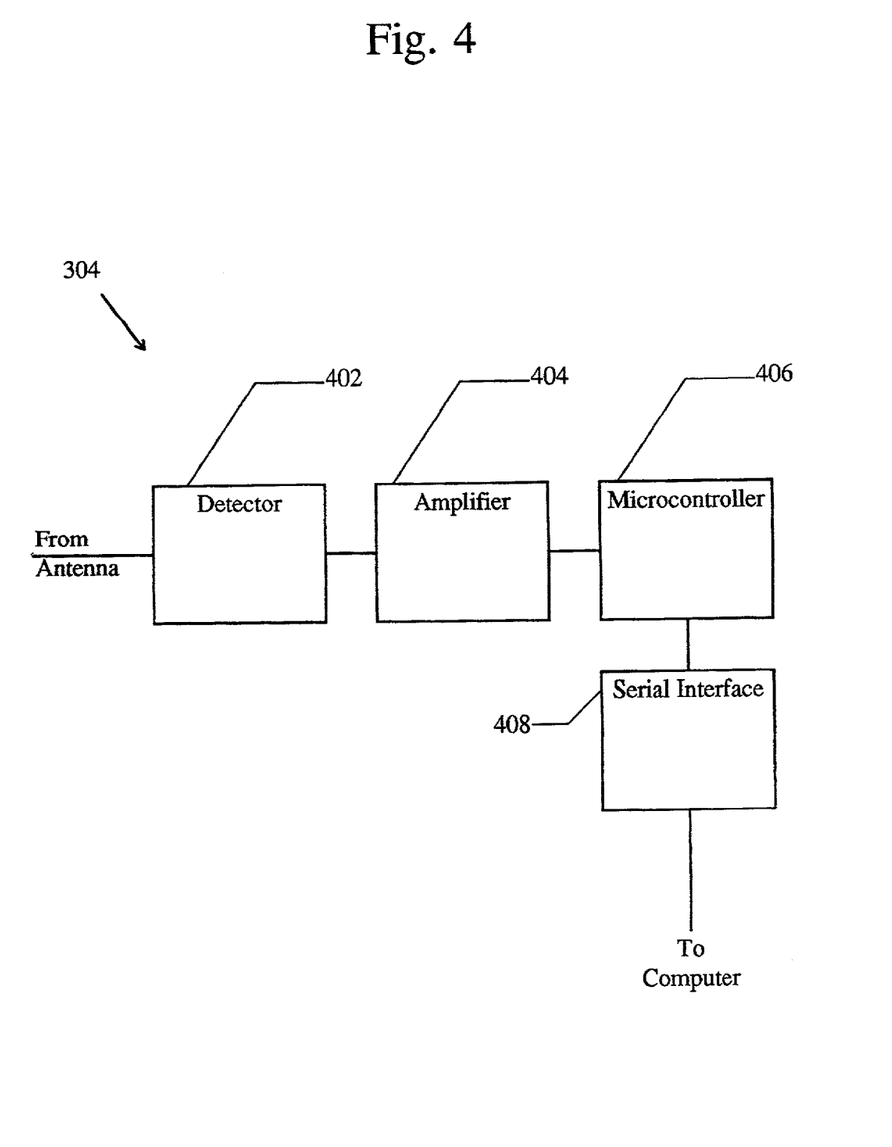
FIG. 4 is a block diagram showing more detail of a receiver according to the present invention.

FIG. 4 is a more detailed block diagram of receiver 304 of FIG. 3. The signal from antenna 306 is input to detector 402, which demodulates, in a well known manner, the RF signal to a baseband signal. Amplifier 404 generates a digital signal from the baseband signal. Microcontroller 406 then extracts the position information from the digital signal output from amplifier 404. Although a microcontroller is preferred, microcontroller 406 may be replaced by a programmed logic device, custom integrated circuit, or other logic device. The extracted position information is output to computer 302 through serial interface 408, in a well known manner.

Figure 5A:
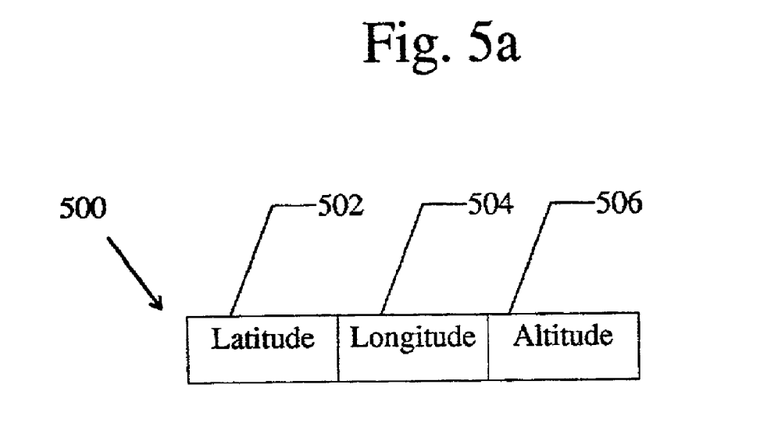
FIG. 5a is an exemplary format of an absolute position signal transmitted by transmitting unit according to the present invention.

The position information modulated onto the RF signal depends upon the location of the transmitting unit generating the signal. Units located in outdoor or open areas transmit an absolute position, which includes up to three components. FIG. 5a is an exemplary format 500 of an absolute position. Format 500 includes a latitude field 502, a longitude field 504, and may optionally include an altitude field 506. Each field is four bytes long.

Figure 5B:
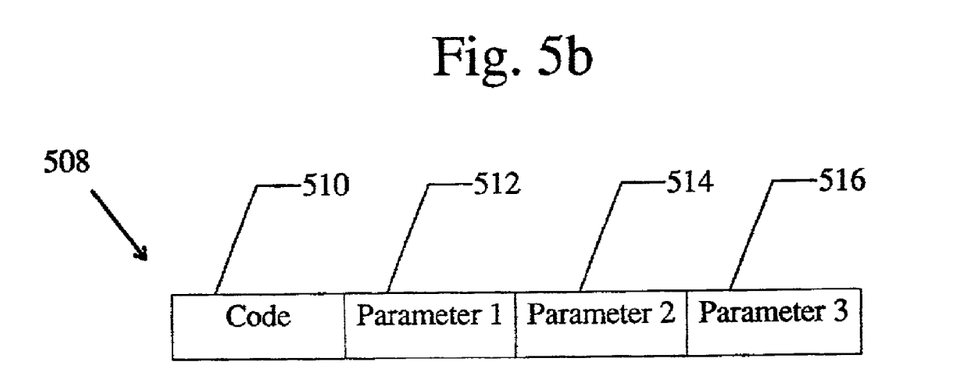
FIG. 5b is an exemplary format of an encoded position signal transmitted by transmitting unit according to the present invention.

Units located indoors may transmit position information that is based on the structure of a building, for example, such as a section and an aisle. Position information in this form is denoted as an encoded position. FIG. 5b is an exemplary format 508 of an encoded position. Format 508 includes a code field 510, and between one and three parameter fields 512–516. Code field 510 is four bytes long, starting with a flag character, such as, for example, "$", followed by three alphanumeric characters. The flag character indicates that the position information is an encoded position. The format of the parameter fields 512–516 are indicated by the alphanumeric fields of code 510. For example, the alphanumeric characters may indicate that the encoded position information identifies a particular building in which the transmitting unit is located. Parameter fields 512–516 are each four bytes long and represent a location within a building. However, the format of the location information may vary from building to building. For example, in some buildings parameter fields 512–516 may represent floor and room numbers, while in other buildings, parameter fields 512–516 may be coordinates in a grid system representing the building.

Figure 5C:
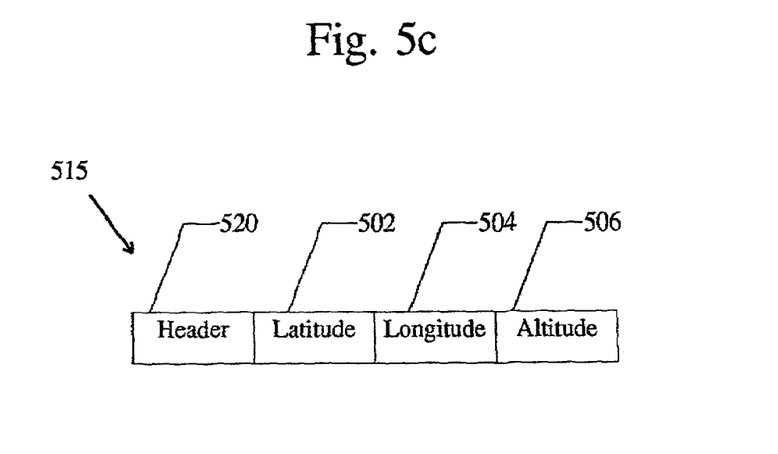
FIG. 5c is an exemplary format of an absolute position output sentence generated by a receiver according to the present invention.

When position information is extracted by a receiving unit, it is further processed for generating data which is compatible with the output of GPS receivers. The GPS compatible data is sent to the computer system 302 over the serial port 308. Use of GPS compatible output data allows existing GPS software to function transparently with the RF signposting system of the present invention. The receiving unit examines the first character of the extracted information to determine whether it is a special character, such as, for example, "$". If the first character is not a special character the extracted information is determined to be an absolute position, and the receiving unit generates an absolute position output sentence 515 as shown in FIG. 5c. The absolute position output sentence includes a header 520, for example, the character string "$SPOST", followed by a space, and the extracted latitude, longitude and optional altitude fields 502–506.

Figure 5D:
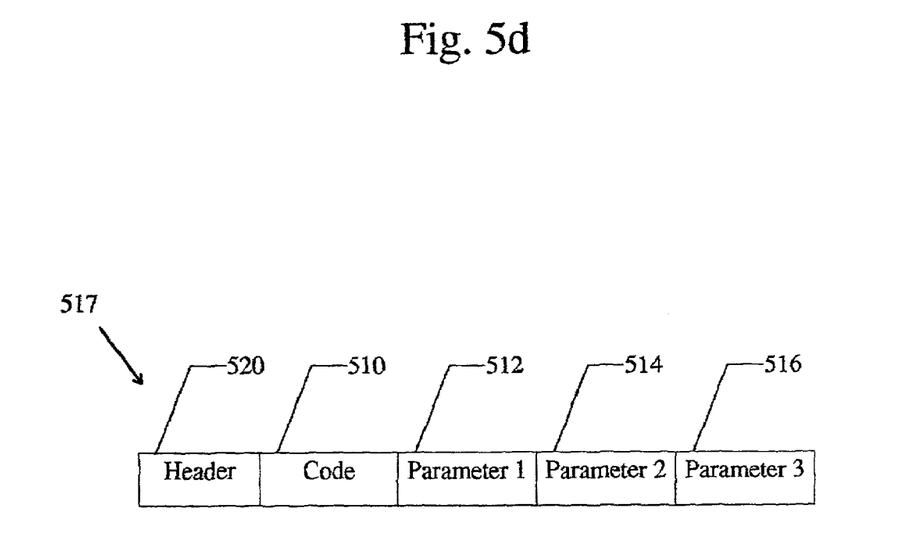
FIG. 5d is an exemplary format of an encoded position output sentence generated by a receiver according to the present invention.

If the first character of the extracted information is a special character, such as "$", the extracted information is determined to be an encoded position, and the receiving unit generates an encoded position output sentence 517 as shown in FIG. 5d. The encoded position output sentence includes a header 520, which is the character string, such as "$SPOST", followed by a space, code 510 and the extracted parameter fields 512–516.

The computer system which receives the output sentence from the receiving unit determines the current position. Because the output sentence information is compatible with GPS information, well-known GPS software may be used to determine position. Such software typically maintains a history of the position information for more accurately estimating the current position. In addition, the software may also be enhanced to take advantage of the unique features of RF signposting. For example, the computer system may maintain a database of buildings in which it can look up encoded position output sentence information as indicated by the received building code, for more accurately estimating the current position.

RF signposting can be used for providing services which require position location in dense areas. For example, on a college campus, in a mall and a mall parking lot, an "emergency signaling service" can use RF signposting for determining a subscriber's location. With such a service, a subscriber needing emergency attention can send his current location information to an emergency control center. The control center then accurately and precisely determines the subscriber's location and dispatches emergency personnel immediately. Other location-based services include a map and navigation service, an electronic yellow pages service and electronic commerce.

Although a specific embodiment of the present invention has been described, it will be understood by those of skill in the art that there are other embodiments which are equivalent to the described embodiment. Accordingly, it is to be understood that the invention is not to be limited by the specific illustrated embodiment, but only by the scope of the appended claims.

What is claimed is:

1. A system for automated position location comprising:
   a plurality of transmitting units servicing a geographic area for automated position location of a mobile receiver, each transmitting unit having a different period of transmission and transmitting a signal in a first or a second format, depending upon the location of the transmitter in the service area and on a RF channel common to all of said plurality of transmitting units, the signal including stored position information in absolute or encoded information related to a position associated with the transmitting unit; and
   at least one mobile receiving unit, receiving the signal including transmitted position information for determining a position of the receiving unit, based on the received position information.

2. The system of claim 1, wherein each transmitting unit periodically transmits the signal including stored position information.

3. The system of claim 2, wherein the position information of a transmitting unit comprises absolute position information in terms of latitude, longitude and altitude.

4. The system of claim 3, wherein the first signal format represents absolute position information comprising a latitude field and a longitude field.

5. The system of claim 4, wherein the absolute position information further comprises an altitude field.

6. The system of claim 2, wherein the second signal format represents encoded or relative position information.

7. The system of claim 6, wherein the relative position information is based on a structure of a building interior.

8. The system of claim 7, wherein the relative position information comprises an electronic frame including a format indicator and information relating to a relative position of a transmitting unit within the structure.

9. The system of claim 8, wherein the relative position information further comprises information having the indicated format and content.

10. The system of claim 7, wherein the relative position information comprises an indication of a building.

11. The system of claim 10, wherein the encoded position further comprises an indication of a transmitter location within the building.

12. The system of claim 1, wherein each transmitting unit comprises:
- a memory storing position information related to a position associated with the transmitting unit;
- a signal generator, coupled to the memory, generating a low power, short-range baseband signal including the stored position information; and
- a transmitter, coupled to the signal generator, outputting a radio-frequency signal in a first or a second format including the stored position information.

13. The system of claim 12, wherein the signal generator periodically generates the signal.

14. The system of claim 13, wherein the signal generator of each transmitting unit generates the signal in a different time period on the RF channel common to all of said transmitters.

15. The system of claim 1, wherein the mobile receiving unit comprises:
- a receiver, receiving the transmitted signal and extracting stored, fixed position information; and
- a processing unit, coupled to the receiver determining the position of the receiving unit based on the extracted position information.

16. The system of claim 15, wherein the received signal is a radio-frequency signal in a first or a second signal format, depending upon the location of a transmitter, and the receiver comprises:
- a detector, demodulating the received radio-frequency signal to a baseband signal;
- an amplifier, coupled to the detector, amplifying the baseband signal to digital levels;
- a microcontroller, coupled to the amplifier, extracting the position information; and
- an interface, coupled to the microcontroller, outputting position information to a computer.

17. A method for automated position location comprising:
- providing a plurality of transmitting units in a service area, each transmitting unit having a different period of transmission;
- transmitting, from each transmitting unit, a signal in a first or a second format on a RF channel common to all of said transmitting units, said signal including position information related to a position associated with the transmitting unit; and
- receiving, at a receiving unit, the signal including transmitted position information; and
- determining a position of the receiving unit, based on the received position information.

18. The method of claim 17, wherein each transmitting unit has a different period of transmission.

19. The method of claim 17, wherein the position information of a transmitting unit comprises absolute position information.

20. The method of claim 19, wherein the first signal format represents absolute position information comprising a latitude field and a longitude field.

21. The method of claim 20, wherein the absolute position information further comprises an altitude field.

22. The method of claim 17, wherein the second signal format represents encoded or relative position information of a transmitting unit within a structure.

23. The method of claim 22, wherein the relative position information is based on a structure of a building interior.

24. The method of claim 23, wherein the relative position information comprises an electronic frame including a format indicator and information relating to a relative position of a transmitting unit within the structure.

25. The method of claim 24, wherein the relative position information further comprises information having the indicated format and content.

26. The method of claim 22, wherein the relative position information comprises an indication of a building interior.

27. The method of claim 26, wherein the relative position information further comprises an indication of a location within the building.

28. A transmitting unit for an automated position location system, comprising:
- a memory for storing data of the transmitting unit;
- a signal generator, connected to the memory, for generating a low power, short range baseband signal including the data; and
- a transmitter, connected to the signal generator, for periodically outputting a radio-frequency signal including the data wherein the data includes position data and encoded position data in a first or a second format depending upon the location of the transmitting unit.

29. The transmitting unit of claim 28, wherein the low power, short range baseband signal is unique in the service area.

30. The transmitting unit of claim 28, wherein the first signal format represents position data comprising absolute position data.

31. The transmitting unit of claim 30, wherein the absolute position data comprises a latitude field and a longitude field.

32. The transmitting unit of claim 31, wherein the absolute position data further comprises an altitude field.

33. The transmitting unit of claim 28, wherein the position data comprises encoded position data.

34. The transmitting unit of claim 33, wherein the encoded position data is based on a structure of a building interior.

35. The transmitting unit of claim 34, wherein the second format represents encoded position data comprising a format indicator and data related to an encoded position.

36. The transmitting unit of claim 35, wherein the encoded position data further comprises data in the format indicated by the format indicator.

37. The transmitting unit of claim 34, wherein the encoded position data comprises an indication of a building.

38. The transmitting unit of claim 37, wherein the encoded position data further comprises an indication of a location within the building by grid coordinates or floor level including room numbers.

* * * * *